3,036,101
PRODUCTION OF ZIRCONIUM SOAPS
Kenneth Tittle, Manchester, England, assignor to Magnesium Elektron Limited, Clifton Junction, near Manchester, England
No Drawing. Filed June 29, 1959, Ser. No. 823,336
Claims priority, application Great Britain Mar. 26, 1959
5 Claims. (Cl. 260—414)

The aim of this invention is to provide an improved method for the preparation of the zirconium salts of organic monocarboxylic acids belonging to the following groups—(i) straight or branched chain saturated or unsaturated monocarboxylic acids (ii) aliphatic monocarboxylic acids when the hydrocarbon chain is interrupted by oxygen or sulphur atoms (ether or thio-ether monocarboxylic acids). Examples of acids included in these groups are (i) 2-ethyl hexoic acid, caprylic, nonylic, lauric, linolenic, stearic, palmitic, abietic, oleic, recinoleic, naphthenic, and phenyl-acetic acid.
(ii) Butoxy-acetic phenoxy-acetic acid.
(iii) Butyl thiopropionic and dodecyl thiopropionic acids.

It will be convenient hereinafter to refer to the zirconium salts of the above-defined monocarboxylic acids as "zirconium soaps."

Several of these zirconium soaps, but especially those derived from naphthenic acid and 2-ethyl hexoic acid, are of commercial importance, e.g. as drier catalysts in paints. It is convenient to incorporate them in the form of solutions in suitable organic solvents.

Hitherto two main methods have been suggested for the preparation of the above zirconium soaps. In the first of these, water-soluble inorganic zirconium salts such as zirconium oxychloride or sodium zirconium sulphate, are allowed to react with the sodium salt of the selected organic acid. The resulting water-insoluble zirconium soap is extracted by solution in a suitable organic solvent, and the solvent is then removed by distillation. In the second method, water-insoluble zirconium carbonate, derived from a water-soluble zirconium inorganic salt and sodium carbonate is agitated with the organic acid. The resulting zirconium soap is then dissolved in an organic solvent and the solvent removed as before.

The chemical reactions underlying the two methods may be presented by the following simplified equations where X.COOH represents the monocarboxylic acid.

(1)    $ZrOCl_2 + 2NaOOC.X = ZrO(OOC.X)_2 + 2NaCl$
       Soluble    Soluble       Insoluble       Soluble (2) (a)
       $Na_2SO_4.ZrOSO_4 + Na_2CO_3 = ZrO.CO_3 + 2Na_2SO_4$
       Soluble        Soluble       Insoluble    Soluble (b)
       $ZrOCO_3 + 2HOOC.X = ZrO(OOC.X) + H_2O + CO_2$
       Insoluble   Insoluble       Insoluble The industrial application of zirconium soaps is partly determined by the absence, or a low content, of certain other metallic soaps, e.g. iron soaps. The zirconium oxychloride, sulphate, double sulphate, carbonate, etc. introduced in the above processes must, therefore, have a corresponding degree of purity. However, the preparation of these zirconium compounds of the required degree of purity, from zirconium ores, tends to be protracted and expensive, because it involves the crystallisation of a pure water-soluble inorganic zirconium salt and the subsequent adequate separation of this salt from the contaminants present in the aqueous mother liquor. I have found that the basic sulphate of zirconium, a water-insoluble material, is sufficiently reactive to be used at high efficiency, in the production of the above zirconium soaps.

I have found that an insoluble basic sulphate of zirconium having the approximate formula $$ZrO(OH)_{0.8}(SO_4)_{0.6}.nH_2O$$

is sufficiently reactive to be used at high efficiency in the production of the above soaps. It is well known that such a zirconium basic sulphate can be readily precipitated and isolated in pure form from the crude zirconium oxychloride solutions which are themselves readily obtained (by dissolution in hydrochloric acid) after opening up zirconium ores, e.g. zircon sand with alkali reagents. Washed precipitated zirconium basic sulphate obtained as an aqueous filter cake or paste from a crude zirconium oxychloride solution, provides an excellent starting material for the purpose of the invention.

The present invention provides an improved, simplified, and more economic procedure for the preparation of the said zirconium soaps by direct utilization of precipitated and substantially water-insoluble zirconium basic sulphate.

I have found that the above-defined zirconium soaps can be prepared by reacting together precipitated zirconium basic sulphate and the monocarboxylic acid or acids in the presence of an alkaline agent in quantity stoichiometrically equivalent to the sulphate content of the zirconium basic sulphate. The alkaline agent consists of one or more of the following, viz. alkali metal hydroxides, alkali metal carbonates, alkaline earth metal oxides and alkaline earth metal hydroxides. In the preferred method of producing zirconium soaps according to the invention I prefer to partly neutralize the organic acid with the amount of alkali equivalent to the sulphate content of the zirconium basic sulphate and to react the thus partly neutralized organic acid with the zirconium basic sulphate.

The formula of precipitated zirconium basic sulphate is approximately $ZrO.(SO_4)_{0.6}(OH)_{0.8}.nH_2O$ and the invention may be expressed by the following equation:

(3)
$ZrO(SO_4)_{0.6}(OH)_{0.8} + 1.2NaOOC.X + 0.8HOOC.X =$
Insoluble         Soluble          Insoluble
                  $ZrO(OOC.X)_2 + 0.6Na_2SO_4 + 0.8H_2O$
                  Insoluble          Soluble wherein OOC.X represents the radical of any of the specified monocarboxylic acids, and wherein NaOOC.X represents the sodium salt of any of such acids. About $4/10$ of the total yield of zirconium soap can be regarded as being derived from direct reaction between zirconium hydroxide and the monocarboxylic acid. This is surprising and unexpected because zirconium hydroxide does not normally react to form zirconium soaps with the monocarboxylic acids defined above, or even with much stronger organic acids such as acetic acid. Another advantage of the present invention is that the amount of alkali required for the production of zirconium soap is only about $6/10$ of that required by the processes represented by Equations 1 and 2.

The process of the present invention can be carried out in one reaction vessel and may, for example, proceed as follows:

The selected monocarboxylic acid, or mixture of such acids, is charged into the reaction vessel, alone or with an organic solvent such as white spirit. The calculated amount of alkali metal hydroxide or carbonate is added dry, or with a small amount of water, and the contents of the vessel thoroughly agitated. After a few minutes, a weighed quantity of zirconium basic sulphate is added in the form of an aqueous paste, and agitation continued at a temperature of 50–80° C. until reaction is complete.

Water is evaporated from the system, by raising the temperature to 100°–110° C. After cooling, the insoluble material is separated from the solution of the zirconium soap and the solvent subsequently evaporated if the zirconium soap is required in solid form.

The following examples describe particular ways of carrying out the invention:

*Example I*

59 gms. (0.21 mol) of naphthenic acid (acid value 200) were mixed with 50 gms. of white spirit. After adding 20 millilitres of a sodium hydroxide solution (containing 4.8 gms.–0.12 mol NaCH) with agitation, the solution was heated to 50° C. for 10 minutes. 51.3 gms. (0.1 mol Zr) of zirconium basic sulphate were added and the temperature raised to 70° C. and maintained at this temperature for 30 minutes. The temperature was then further increased to 105° C. until all the water has been eliminated. After cooling the crystalline sodium sulphate and a small amount of unreacted zirconium material were removed by filtration leaving a clear solution of zirconium naphthenate in white spirit.

Zirconium efficiency: greater than 98%.

*Example II*

Substantially as in Example I with the exception that 30 gms. (0.21 mol) of 2-ethyl-hexoic acid (acid value 390) were used instead of 59 gms. of naphthenic acid.

Zirconium efficiency: greater than 98%.

*Example III*

33 gms. (0.119 mol) of naphthenic acid (acid value 200) were mixed with 50 mls. white spirit. 20 mls. of water and 3.4 gms. (.032 mol) anhydrous sodium carbonate were added; the mixture stirred and held at 60° C. until the solution was almost clear. After adding 27.3 gms. of zirconium basic sulphate (4.9 gms. Zr, 0.54 mol) the solution was heated to 70° C. for 45 minutes to complete the reaction. Subsequent operations were similar to those described in Example I.

Zirconium efficiency: 99%.

*Example IV*

Substantially as in Example III except that water was not added when charging anhydrous sodium carbonate.

Zirconium efficiency: 91%.

*Example V*

Substantially as in Example III except that 2.1 gms. (0.032 mol) of calcium hydroxide was used instead of an equivalent amount of sodium carbonate.

Zirconium efficiency: 90%.

*Example VI*

Substantially as in Example III except that 1.8 gms. (0.032 mol) of calcium oxide were used instead of an equivalent amount of sodium carbonate.

Zirconium efficiency: 91%.

*Example VII*

33.0 g. (0.12 mol) of naphthenic acid (acid value =200) were heated to 50° C. in a beaker. 20 mls. water and 2.6 g. sodium hydroxide were added with stirring. When the sodium hydroxide had dissolved 29.2 g. of zirconium basic sulphate paste (5 g. zirconium, 0.055 mol) were added with stirring. The reaction mixture was heated at 60–70° C. for 30 minutes with stirring. The mixture was then allowed to cool and the zirconium soap extracted with 50 ml. of white sprit. The solution in white spirit was separated from the water present and the insoluble material was readily filtered off leaving a solution of zirconium naphthenate in white spirit.

Recovery of zirconium 98%.

*Example VIII*

Similar to Example VII except replacing 33.0 g. of naphthenic acid with 16.9 g. of 2-ethyl-hexoic acid.

In place of white spirit it is possible to use other hydrocarbons, e.g. benzene, toluene or naphtha.

I claim:

1. A method of preparing zirconium salts of organic monocarboxylic acids comprising reacting together water insoluble zirconium basic sulphate and the acid in the presence of an alkaline agent, which alkaline agent consists of at least one substance selected from the group consisting of alkali metal hydroxides, alkali metal carbonates, alkaline earth metal oxides and alkaline earth metal hydroxides, said acid consisting of at least one acid selected from the group consisting of (i) straight and branched chain saturated and unsaturated monocarboxylic acids and (ii) aliphatic monocarboxylic acids in which the hydrocarbon chain is interrupted by oxygen atoms and (iii) aliphatic monocarboxylic acids in which the hydrocarbon chain is interrupted by sulphur atoms: said alkaline agent being in quantity stoichiometrically equivalent to the sulphate content of the zirconium basic sulphate; and recovering the zirconium salt.

2. A method as claimed in claim 1 wherein the acid is first partly neutralized with the alkaline agent and the resultant substance is then reacted with the zirconium basic sulphate.

3. A method of preparing zirconium salts of organic monocarboxylic acids comprising reacting together water insoluble zirconium basic sulphate and the acid in the presence of an alkaline agent, which alkaline agent consists of at least one substance selected from the group consisting of alkali metal hydroxides, alkali metal carbonates, alkaline earth metal oxides and alkaline earth metal hydroxides, said acid being napthenic acid, the quantity of said alkaline agent being stoichiometrically equivalent to the sulphate content of the zirconium basic sulphate; and recovering the zirconium salt.

4. A method of preparing zirconium salts of organic monocarboxylic acids comprising reacting together zirconium basic sulphate and the acid in the presence of an alkaline agent, which alkaline agent consists of at least one substance selected from the group consisting of alkali metal hydroxides, alkali metal carbonates, alkaline earth metal oxides and alkaline earth metal hydroxides, said acid being 2-ethyl-hexoic acid, the quantity of said alkaline agent being stoichiometrically equivalent to the sulphate content of the zirconium basic sulphate; and recovering the zirconium salt.

5. A method as claimed in claim 1 wherein the acid is mixed with white spirit whereafter the alkaline agent is added; the mixture is heated to a temperature of approximately 50° C. for a period long enough to effect reaction whereafter the zirconium basic sulphate is added and the temperature is raised to approximately 70° C. for a period to effect reaction; the mixture is then heated to approximately 105° C. to eliminate water.

References Cited in the file of this patent

UNITED STATES PATENTS

| | | |
|---|---|---|
| 2,221,975 | Kinzie | Nov. 19, 1940 |
| 2,252,658 | Bigelow | Aug. 12, 1941 |
| 2,482,816 | Van Mater | Sept. 27, 1949 |
| 2,739,905 | Mack | Mar. 27, 1956 |
| 2,802,847 | Blumenthal | Aug. 13, 1957 |

OTHER REFERENCES

Journal, Society of Leather Trades' Chemists (February 1958), vol. 42, pages 59 to 62 (England).